(12) United States Patent
Lin et al.

(10) Patent No.: US 9,702,750 B1
(45) Date of Patent: Jul. 11, 2017

(54) MATERIAL LEVEL INDICATOR

(71) Applicant: FINETEK Co., Ltd., New Taipei (TW)

(72) Inventors: I-Chu Lin, New Taipei (TW);
Liang-Chi Chang, New Taipei (TW);
Wei-Yu Chen, New Taipei (TW);
Chun-Han Huang, New Taipei (TW);
Yi-Liang Hou, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 72 days.

(21) Appl. No.: 14/994,132

(22) Filed: Jan. 12, 2016

(51) Int. Cl.
*G01F 23/284* (2006.01)

(52) U.S. Cl.
CPC .................................. *G01F 23/284* (2013.01)

(58) Field of Classification Search
None
See application file for complete search history.

(56) References Cited

U.S. PATENT DOCUMENTS

| | | | | |
|---|---|---|---|---|
| 5,263,371 A * | 11/1993 | Maresca, Jr. | ....... | G01F 23/2962 181/124 |
| 6,559,657 B1 * | 5/2003 | McCarthy | ............. | G01F 23/284 324/637 |
| 6,867,729 B2 * | 3/2005 | Berry | ................... | G01F 23/284 342/118 |
| 8,018,373 B2 * | 9/2011 | Edvardsson | .......... | G01F 23/284 342/118 |
| 8,393,208 B2 * | 3/2013 | Miskell | ................ | G01F 23/284 73/290 V |
| 2015/0130650 A1 * | 5/2015 | Korsbo | .................. | H01Q 15/14 342/5 |

\* cited by examiner

*Primary Examiner* — Laura Martin
*Assistant Examiner* — Jean Morello
(74) *Attorney, Agent, or Firm* — Chun-Ming Shih; HDLS IPR Services (57) ABSTRACT

A material level indicator includes a probe, first and second signal compensating units, arranged at first and second ends of the probe respectively, and a controlling module arranged at the first end and includes a signal processor, a signal emitter, and a signal receiver. The second end is opposite to the first end. The signal processor is connected to the signal emitter and the signal receiver. The signal emitter emits an electromagnetic signal from the first end to the second end of the probe. The first and second signal compensating units reflect the electromagnetic signal, and the signal processor generates first and second time interval differences according to the reflected electromagnetic signal received by the signal receiver. The signal processor calibrates an environmental coefficient and indicates a dielectric coefficient of the material according to the first and second time interval differences respectively.

14 Claims, 8 Drawing Sheets

MATERIAL LEVEL INDICATOR

FIELD OF THE INVENTION

The technical field relates to indicators, more particularly to a material level indicator.

BACKGROUND OF THE INVENTION

Warehouse management is an important subject for storing and preserving materials. In a variety of industries such as the petrochemical industry, bulk food industry, feed industry, steel industry and cement industry, warehouses are used to store materials. The materials stored in warehouses include materials of different states including solids, liquids, and solid-liquid mixtures. For example, these materials are petroleum, coal, iron core, cement, corn, wheat, flour, butter and any other material. When different materials are stored in a warehouse, the temperature, humidity, and amount of stored materials in the warehouse will affect the expiration and preservation quality of the materials stored in the warehouse. For certain specific industries, explosions or other industrial accidents may occur if the temperature of the warehouse is not controlled properly. For instance, dry materials such as corns, soybeans, and conductive dust may lead to smoldering sparks or dust explosion due to temperature change.

However, most general material level indicators are just applicable for measuring a material level only and unable to detect environmental conditions and material conditions in a warehouse.

In view of the aforementioned drawbacks of the prior art, the discloser of this disclosure based on years of experience in the industry to conduct extensive researches and experiments and finally provided a feasible solution to overcome the drawbacks of the prior art effectively.

SUMMARY OF THE INVENTION

It is a primary objective of this disclosure to provide a material level indicator for measuring the material level in a container, and the material level indicator comprises a probe, a plurality of first signal compensating units, at least one second signal compensating unit and a controlling module. The probe includes a first end and a second end opposite to the first end; the first signal compensating unit is installed at the first end, and a first spacing distance is defined between two adjacent first signal compensating units; and the second signal compensating unit is installed at the second end. The controlling module is disposed at the first end and includes a signal processor, a signal emitter and a signal receiver, and the signal emitter is electrically coupled to the signal processor for generating an electromagnetic signal; and the signal receiver electrically is coupled to the signal processor. The electromagnetic signal generated by the signal emitter is transmitted through the first end to the second end, and the first signal compensating unit reflects the electromagnetic signal, and the signal receiver receives the electromagnetic signal reflected from the first signal compensating units and then transmits the electromagnetic signal to the signal processor to generate a first travel time difference, and the signal processor corrects an environmental coefficient according to the first travel time difference, and the second signal compensating unit reflects the electromagnetic signal, and the signal receiver receives the electromagnetic signal reflected by the second signal compensating units and transmits the electromagnetic signal to the signal processor to generate a second travel time difference, and the signal processor detects a dielectric coefficient of the material according to the second travel time difference.

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

Figure 1:
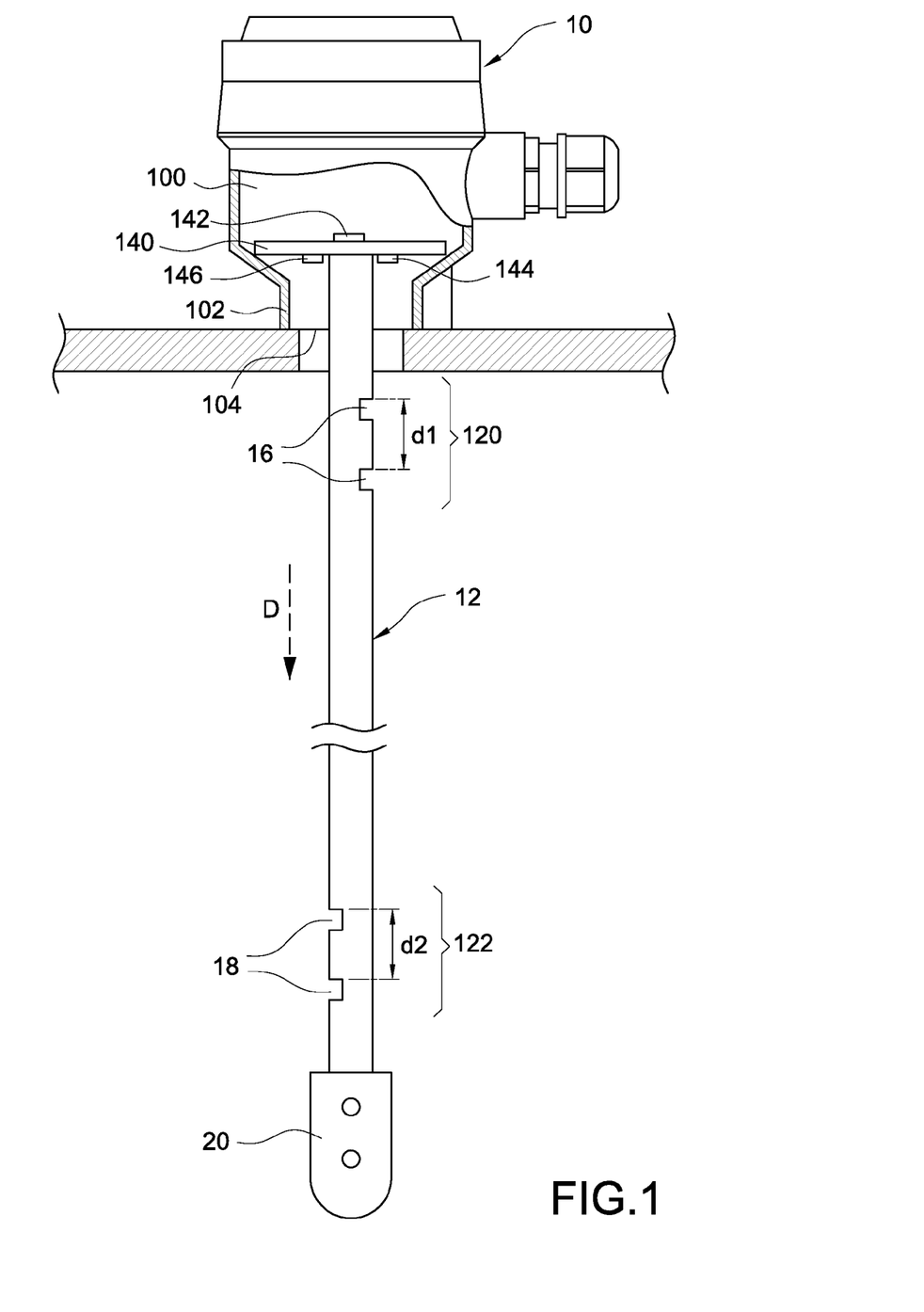
FIG. 1 is a schematic view showing the architecture of a material level indicator in accordance with a first preferred embodiment of this disclosure.

With reference to FIG. 1 for a schematic view showing the architecture of a material level indicator in accordance with the first preferred embodiment of this disclosure, the material level indicator is installed at the top of a container such as a bucket or a tank that contains a material and provided for detecting an environmental coefficient of the container, the height (or material level) of the material, and dielectric coefficient of the material. In FIG. 1, the material level indicator comprises an electrical box 10, a probe 12 and a controlling module 14. The electrical box 10 has a containing space 100, and a through hole 104 formed at the bottom 102 of the electrical box 10 and communicated to the containing space 100.

The probe 12 is installed at the bottom 102 of the electrical box 10 and extended in a predetermined direction D and includes a first end 120 and a second end 122 opposite to the first end 120. The probe 12 is substantially a circular cylinder or a polygonal cylinder, and it may be an inflexible steel stick or may have a flexible wire.

The probe 12 has a plurality of first signal compensating units 16 disposed at the first end 120 of the probe 12, and arranged equidistantly, and a first spacing distance d1 is defined between two adjacent first signal compensating units 16. In FIG. 1, the first signal compensating unit 16 is a recess formed at the first end 120 of the probe 12.

The probe 12 has a plurality of second signal compensating units 18 disposed at the second end 122 of the probe 12 and arranged equidistantly, and a second spacing distance d2 is defined between two adjacent second signal compensating units 18, and the second spacing distance d2 may be unequal to the first spacing distance d1. In FIG. 1, the second signal compensating unit 18 is a recess formed at the second end 120 of the probe 12.

It is noteworthy that the first signal compensating unit 16 and the second compensating unit 18 as shown in FIG. 1 are recesses, but they can also be protrusions or any other structures capable of reflecting the electromagnetic signal in other embodiments. In addition, the height and aperture of the recess of the first signal compensating unit 16 are not necessary to be equal to those of the second signal compensating unit 18, and first signal compensating unit 16 and the second signal compensating unit 18 are connected in a predetermined direction D parallel to the probe 12, or in a predetermined direction D not parallel to the probe 12. Further, the first signal compensating unit 16 and the second signal compensating unit 18 may be circular fasteners sheathed on the probe 12 and the circular fastener is formed on the aforementioned recess.

Figure 2:
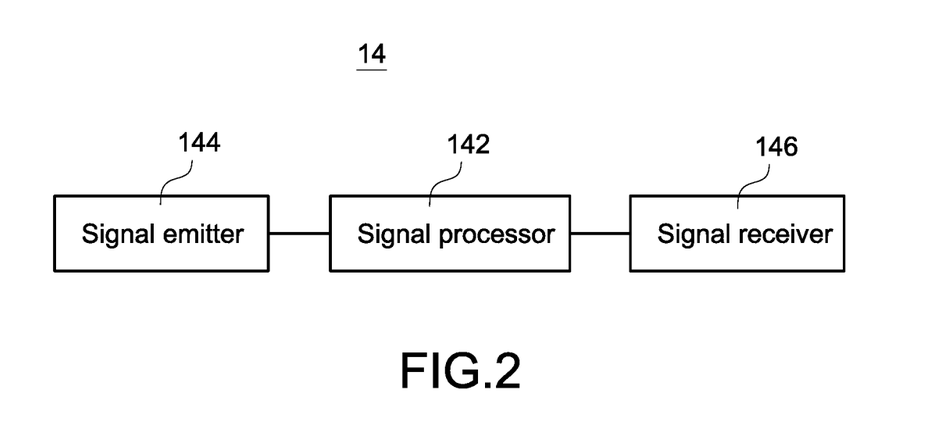
FIG. 2 is a schematic circuit block diagram of a controlling module in accordance with the first preferred embodiment of this disclosure.

The controlling module 14 is disposed in a containing space 100 and includes a circuit board 140, a signal processor 142, a signal emitter 144 and a signal receiver 146. With reference to FIG. 2 for a schematic circuit diagram of a controlling module 14 of this disclosure, the circuit board 140 may be a printed circuit board with copper circuits laid on both sides, and the signal processor 142, the signal emitter 144 and the signal receiver 146 are installed on the circuit board 140, and the signal processor 142 is electrically coupled to the signal emitter 144 and the signal receiver 146.

In FIG. 1, the signal processor 142 is installed on one of the surfaces of the circuit board 140, and the signal emitter 144 and the signal receiver 146 are installed on a surface of the circuit board 140 without the signal processor 142, and an end of the probe 12 may be connected to a surface of the circuit board 140 having the signal emitter 144 and the signal receiver 146. However, the signal processor 142, the signal emitter 144 and the signal receiver 146 may be installed on the same surface of the circuit board 140 in another embodiment.

When the environmental coefficient is corrected and the dielectric coefficient of the material is detected in the container, the second end 122 of the probe 12 must be buried in the material, and the first end 120 may be exposed from the material or buried deeply in the material.

Figure 3:
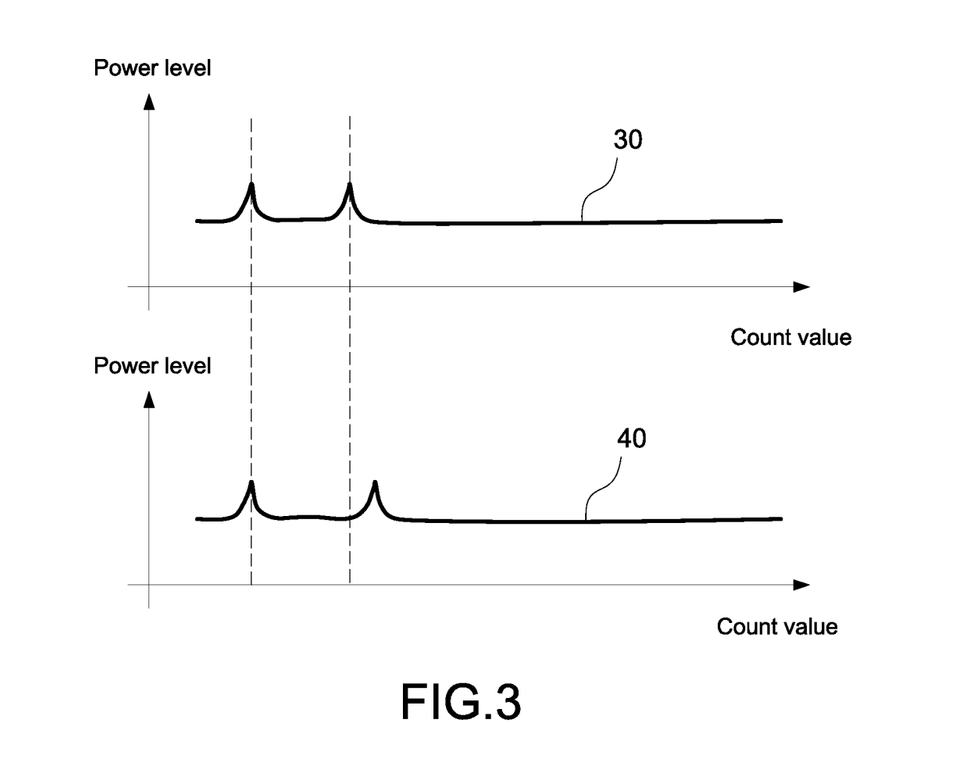
FIG. 3 is a curve of first travel time difference versus first predetermined travel time difference.

The signal emitter 144 for generating an electromagnetic signal may be a quartz oscillator. The electromagnetic signal generated by signal emitter 144 is transmitted along a surface of the probe 12. When the electromagnetic signals are transmitted to the first signal compensating unit 16, some of the electromagnetic signals are reflected by the first signal compensating unit 16 and transmitted to the signal processor 142 to generate a first travel time difference as shown in the curve 40 of FIG. 3.

It is noteworthy that the signal processor 142 includes a built-in counter for counting the count value of the electromagnetic signals generated by the signal emitter 144, received by the signal receiver 146, and reflected by the first signal compensating unit 16, and then the signal processor 142 converts the count value into time by a Time Domain Reflectometry (TDR). In addition, the signal processor 142 further has a built-in first predetermined travel time difference as shown in the curve 30 of FIG. 3. This first predetermined travel time difference is generated after the electromagnetic signal is reflected by the first signal compensating unit 16 and transmitted to the signal processor 142 when the container has not contained the material.

When the container contains the material, the first travel time difference is greater than the first predetermined travel time difference since the material is attached to the probe 12 or the material produces steam, so that the signal processor 142 may compare the first travel time difference with the first predetermined travel time difference to correct the error (or the environmental coefficient) caused by a change of the environmental condition.

When the electromagnetic signals generated by the signal emitter 144 are transmitted along a surface of the probe 12 to the second signal compensating unit 18, some of the electromagnetic signals are reflected by the second signal compensating unit 18 and transmitted to the signal processor 142 to generate a second travel time difference. When the second travel time difference is detected, the material has already been put into the container.

The signal processor 142 further builds in a second predetermined travel time difference, wherein the second predetermined travel time difference is generated by reflecting the electromagnetic signal by the second signal compensating unit 18 and transmitting the reflected electromagnetic signal to the signal processor when the material has not been put into the container.

When the material is put into the container, the second travel time difference is greater than the second predetermined travel time difference since the material is attached to the probe 12, so that the signal processor 142 detects the dielectric coefficient of the material by comparing the second travel time difference with the second predetermined travel time difference.

Figure 4A:
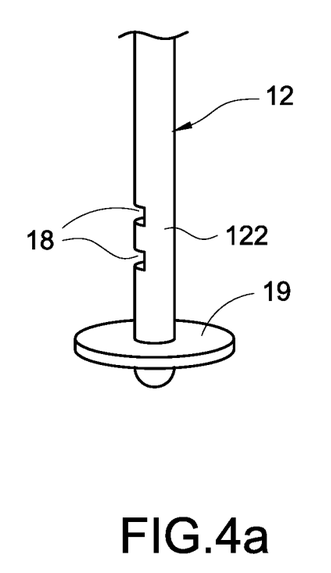
FIGS. 4a to 4d are schematic views of a signal booster in accordance with this disclosure.
Figure 4B:
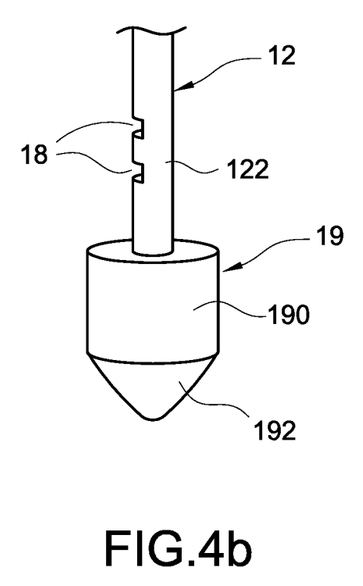
Figure 4C:
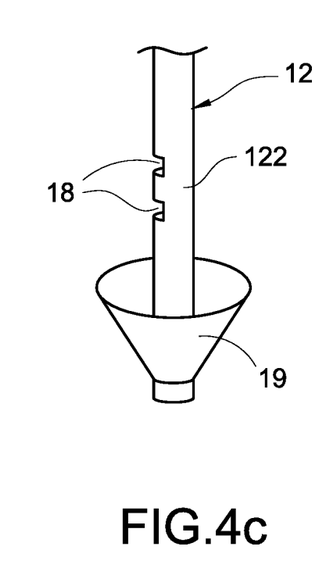
Figure 4D:
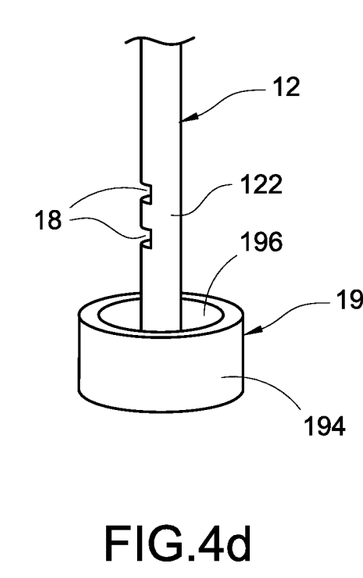
Figure 5:
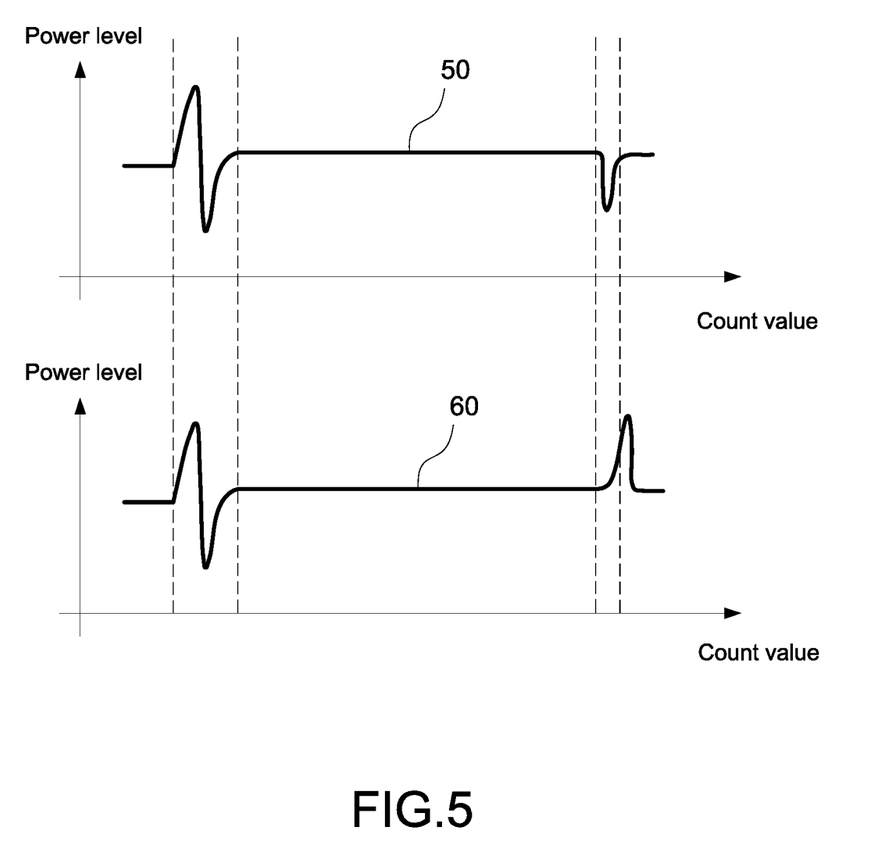
FIG. 5 is a curve of second travel time signals of a material level indicator without a signal booster and a material level indicator with a signal booster.

Since the second signal compensating unit 18 is far away from the controlling module 14, therefore the second signal compensating unit 18 reflects a signal generated by reflecting the electromagnetic signal by the second travel time difference, and such signal is weaker than that of the first travel time difference as shown in the curve 50 of FIG. 5. To effectively prevent the failure of transmitting the second travel time difference to the signal receiver 146, the material level indicator includes a signal booster 19 as shown in FIGS. 4a to 4d. The signal booster 19 is coupled to the second end 122 of probe 12 and capable of enhancing the signal intensity of the second travel time difference. Wherein, the curve 60 of FIG. 5 shows that the material level indicator of the second travel time difference including the signal booster 19 has signal intensity significantly greater than the signal intensity of the second travel time difference excluding the signal booster 19.

In FIG. 4a, the signal booster 19 is substantially in a ring shape and coupled to the second end 122 of the probe 12. In FIG. 4b, the signal booster 19 includes a main body 190 and an extension 192, and a side of the main body 190 is coupled to the probe 12, and the main body 190 has an external diameter greater than the external diameter of the probe 12. The extension 192 is coupled to a side of the main body 190 without the probe 12, and the extension 192 has an external diameter decreasing in the direction extended towards the probe 12 (in order words, the external diameter of the extension 192 decreases with the distance away from the electrical box 10). In FIG. 4c, the signal booster 19 is in the shape of a funnel, and its external diameter decreases with the distance away from the electrical box 10. In FIG. 4d, the signal booster 19 includes a cylinder 194 and a recess 196, and the recess 196 is formed at an end of the cylinder 190 adjacent to the electrical box 10; and the cylinder 194 has an external diameter greater than the external diameter of the probe 12, and the cylinder 194 is a circular cylinder or a polygonal cylinder.

Figure 6A:
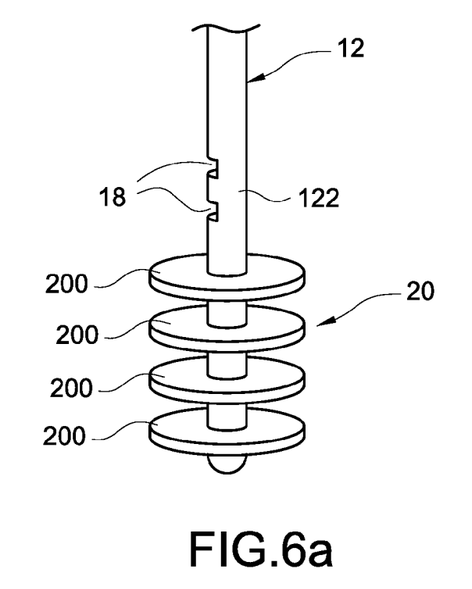
FIGS. 6a to 6c are schematic views of a weight of this disclosure.
Figure 6B:
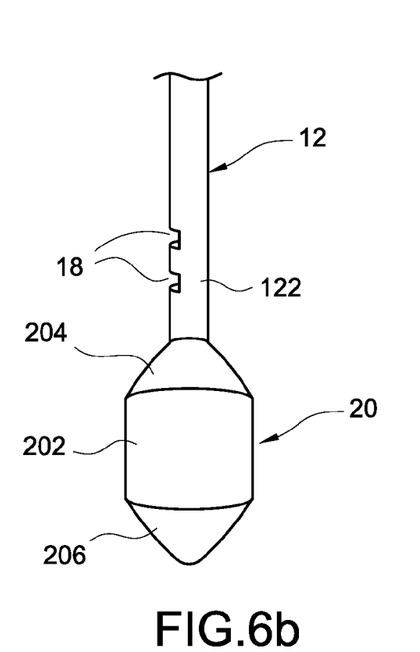
Figure 6C:
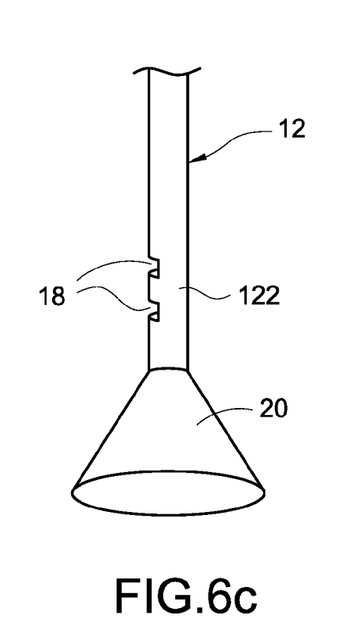
Figure 7:
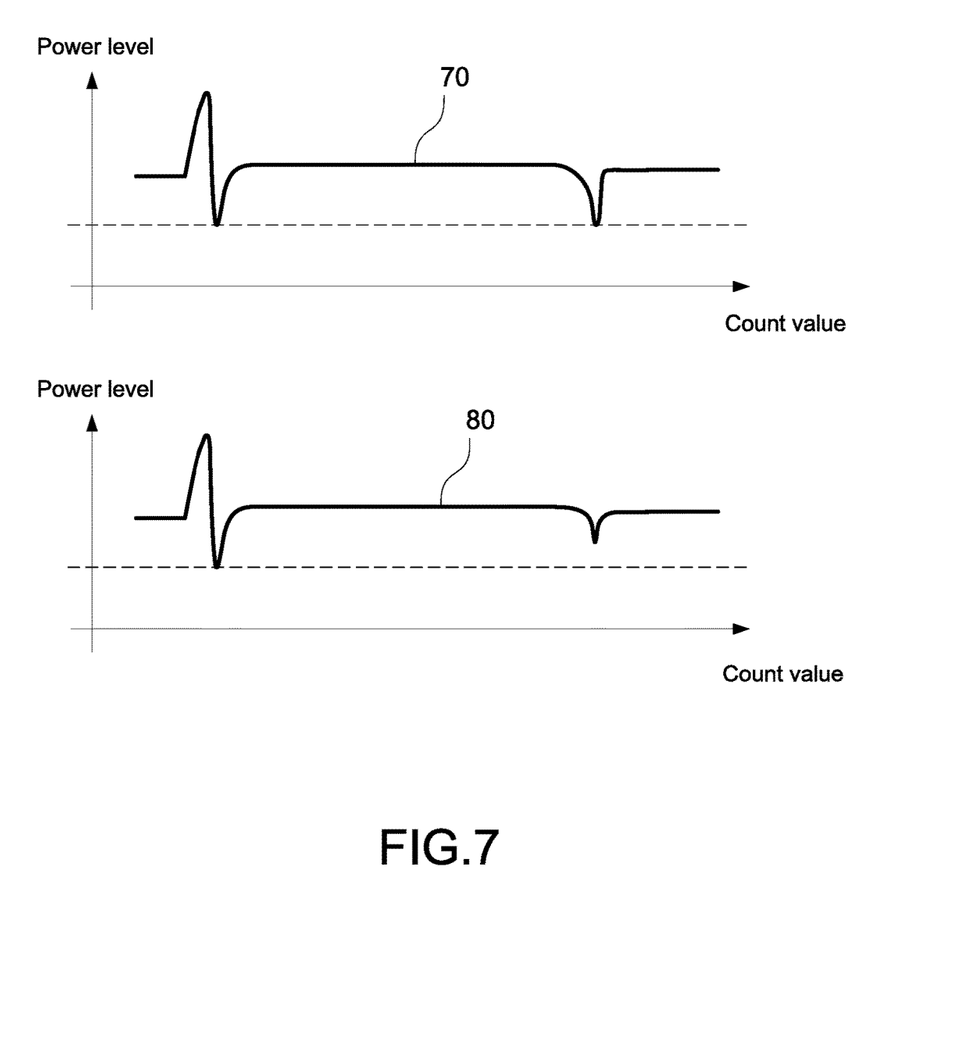
FIG. 7 is a curve of noises of a material level indicator without a weight and a material level indicator with a weight.

Further, the second end 122 of the material level indicator selectively includes a weight 20 instead of the signal booster 19 as shown in FIGS. 6a to 6c to reduce the noise of the second travel time difference. With reference to FIG. 7 for a curve 70 of the detect signal of the material level indicator without the weight and a curve 80 of the detect signal of the material level indicator having the weight; and the weight 20 is coupled to the second end 122 of the probe 12. In FIG. 6a, the weight 20 is comprised of a plurality of ring members 200 and the ring members 200 are arranged equidistantly; wherein, the ring member 200 has an external diameter greater than the external diameter of the probe 12. In FIG. 6b, the weight 20 includes a connecting portion 202, and an upper end 204 and lower end 206 disposed on two opposite sides of the connecting portion 202 respectively and coupled to the connecting portion 202. The connecting portion 202 has an external diameter greater than the external diameter of the probe 12; the upper end 204 is coupled to the second end 122, and the upper end 204 has an external diameter increasing with the distance away from the second end 122; the lower end 206 has an external diameter decreasing with the distance away from the connecting portion 202. In FIG. 6c, the weight 20 is in a conical shape and its external diameter increases with the distance away from the second end 122.

Figure 8:
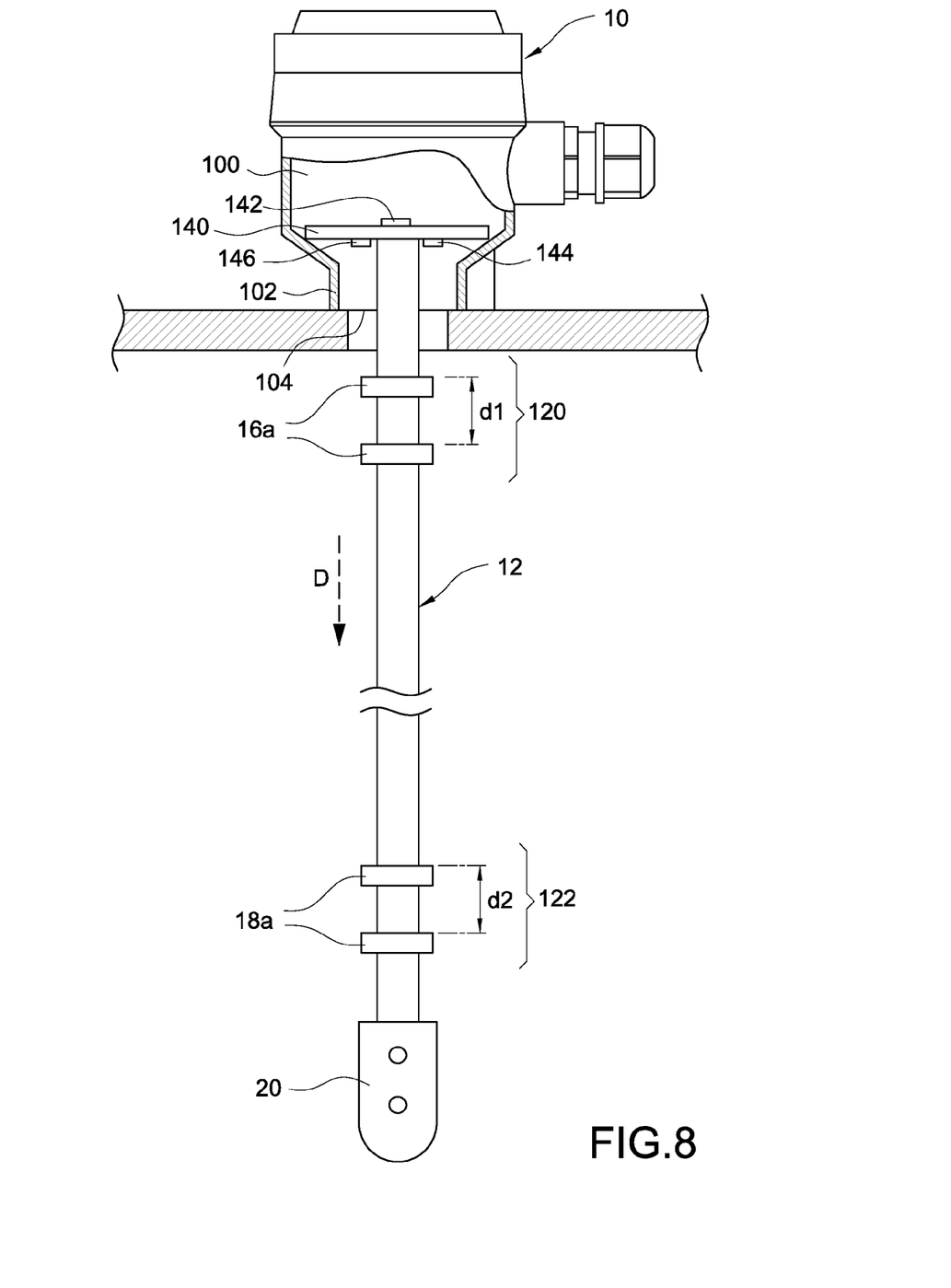
FIG. 8 is a schematic view showing the architecture of a material level indicator in accordance with a second preferred embodiment of this disclosure.

With reference to FIG. 8 for schematic view showing the architecture of a material level indicator in accordance with the second preferred embodiment of this disclosure, the material level indicator as shown in FIG. 8 is substantially the same as that as shown in FIG. 1, except that each of the first signal compensating unit 16a and the second signal compensating unit 18a as shown in FIG. 8 is an independent protrusion. When the probe 12 is a steel stick, the probe 12, the first signal compensating unit 16a and the second signal compensating unit 18a are integrally formed. When the probe 12 is a wire, the first signal compensating unit 16a and the second signal compensating unit 18a are sheathed on a circular member of the probe 12. In FIG. 8, the first signal compensating unit 16a has an external diameter equal to the external diameter of the second signal compensating unit 18a. However, the actual implementation is not limited to such arrangement only. The functions and related description of the material level indicator of this preferred embodiment are the same as those of the material level indicator of the first preferred embodiment, and thus will not be repeated. The material level indicator of this preferred embodiment at least achieves the same functions of the material level indicator of the first preferred embodiment.

Figure 9:
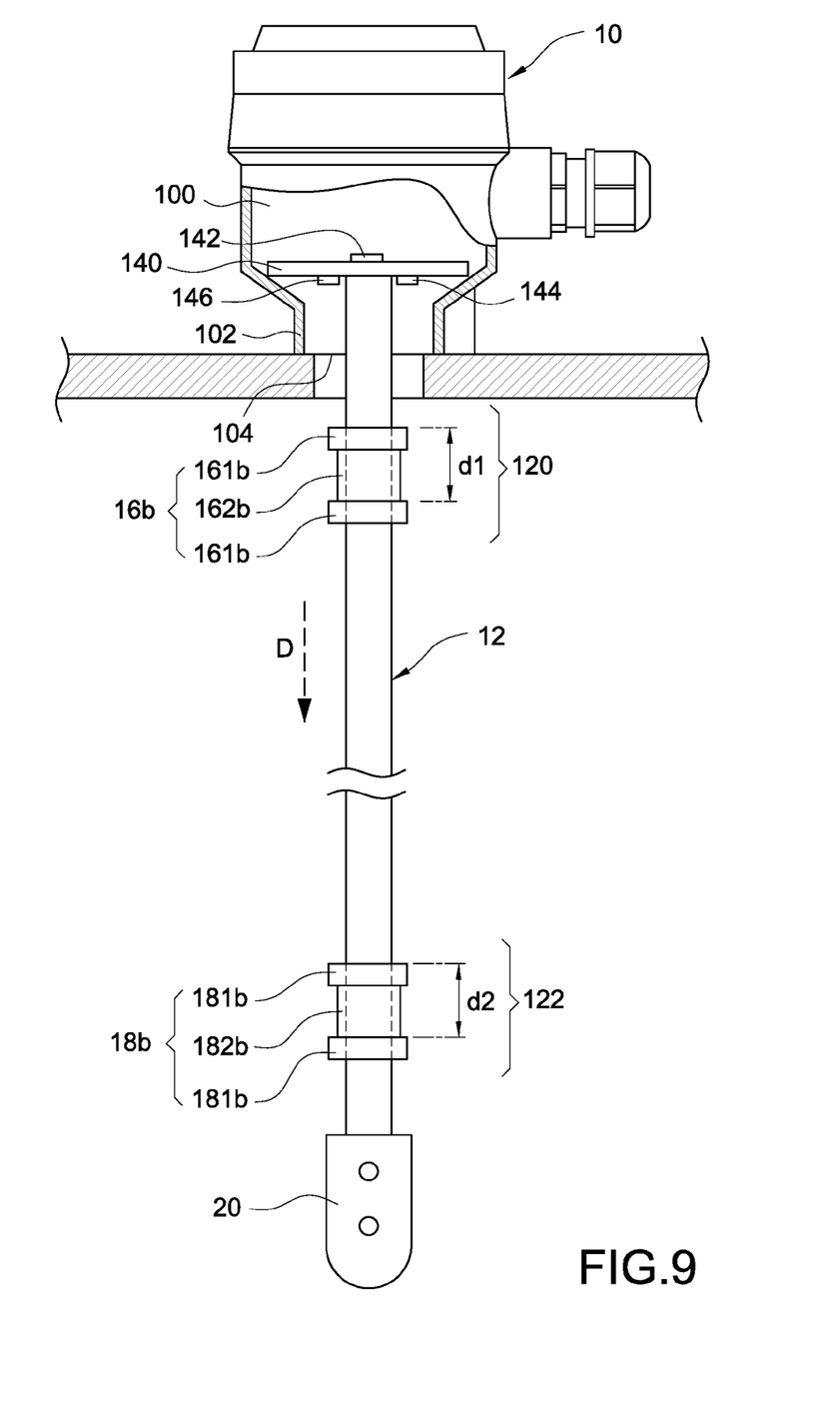
FIG. 9 is a schematic view showing the architecture of a material level indicator in accordance with a third preferred embodiment of this disclosure.

With reference to FIG. 9 for a schematic view showing the architecture of a material level indicator in accordance with the third preferred embodiment of this disclosure, the material level indicator as shown in FIG. 9 is substantially the same as that as shown in FIG. 8, except that the material level indicator as shown in FIG. 9 further comprises a connector 162b installed between two adjacent first signal compensating units 161b to provide an appearance of an I-shaped fastener 16b, and a connector 182b installed between two adjacent second signal compensating units 181b to form an I-shaped fastener 18b. The functions and related description of the material level indicator of this preferred embodiment are the same as those of the material level indicator of the first preferred embodiment, and thus will not be repeated. The material level indicator of this preferred embodiment at least achieves the same functions of the material level indicator of the first preferred embodiment.

While this disclosure has been described by means of specific embodiments, numerous modifications and variations could be made thereto by those skilled in the art without departing from the scope and spirit of this disclosure set forth in the claims.

What is claimed is:

1. A material level indicator, for measuring a material level in a container, comprising:
   a probe, including a first end and a second end opposite to the first end;
   a plurality of first signal compensating units, installed at the first end, and having a first spacing distance defined between two adjacent first signal compensating units;
   a plurality of second signal compensating units, installed at the second end, and having a second spacing distance defined between two adjacent second signal compensating units; and
   a controlling module, disposed at the first end, and comprising:
   a signal processor;
   a signal emitter, electrically coupled to the signal processor, for generating an electromagnetic signal, and the electromagnetic signal being transmitted from the first end to the second end; and
   a signal receiver, electrically coupled to the signal processor;
   wherein, the first signal compensating units reflect the electromagnetic signal, and the signal receiver receives the electromagnetic signal reflected by the first signal compensating units and transmitted to the signal processor to generate a first travel time difference, and the signal processor corrects an environmental coefficient according to the first travel time difference, and the second signal compensating units reflect the electromagnetic signal, and the signal receiver receives the electromagnetic signal reflected by the second signal compensating units and transmitted to the signal processor to generate a second travel time difference, and the signal processor detects a dielectric coefficient of the material according to the second travel time difference.

2. The material level indicator according to claim 1, wherein the first spacing distance is different from the second spacing distance.

3. The material level indicator according to claim 1, wherein the first signal compensating units and the second signal compensating units are recesses respectively.

4. The material level indicator according to claim 1, wherein the first signal compensating units and the second signal compensating units are protrusions respectively.

5. The material level indicator according to claim 4, further comprising a connector installed between two adjacent first signal compensating units or two adjacent second signal compensating units.

6. The material level indicator according to claim 1, further comprising a signal booster coupled to the second end for enhancing signal intensity of the second travel time difference.

7. The material level indicator according to claim 6, wherein the signal booster is circularly coupled to the second end of the probe.

8. The material level indicator according to claim 6, wherein the signal booster comprises a main body and an extension, and the extension has an external diameter decreasing with the distance away from the second end.

9. The material level indicator according to claim 6, wherein the signal booster is substantially in the shape of a funnel, and the signal booster has an external diameter decreasing with the distance away from the second end.

10. The material level indicator according to claim 6, wherein the signal booster comprises a cylinder and a recess, and the recess is formed at an end of the cylinder proximate to the second end.

11. The material level indicator according to claim 1, wherein the probe further comprises a weight coupled to the second end.

12. The material level indicator according to claim 11, wherein the weight has an external diameter increasing with the distance away from the second end.

13. The material level indicator according to claim 11, wherein the weight has a connecting portion, and an upper end and a lower end disposed on two opposite sides of the connecting portion respectively and coupled to the connecting portion, and the upper end is coupled to the second end, and the upper end has an external diameter increasing with the distance away from the second end, and the lower end has an external diameter decreasing with the distance away from the connecting portion.

14. The material level indicator according to claim 11, wherein the weight is comprised of a plurality equidistant ring members.

* * * * *